May 29, 1934.  E. R. SMITH ET AL  1,961,090
ELECTRICALLY CONTROLLED SPEED COORDINATING MECHANISM
Filed July 30, 1931  4 Sheets-Sheet 1
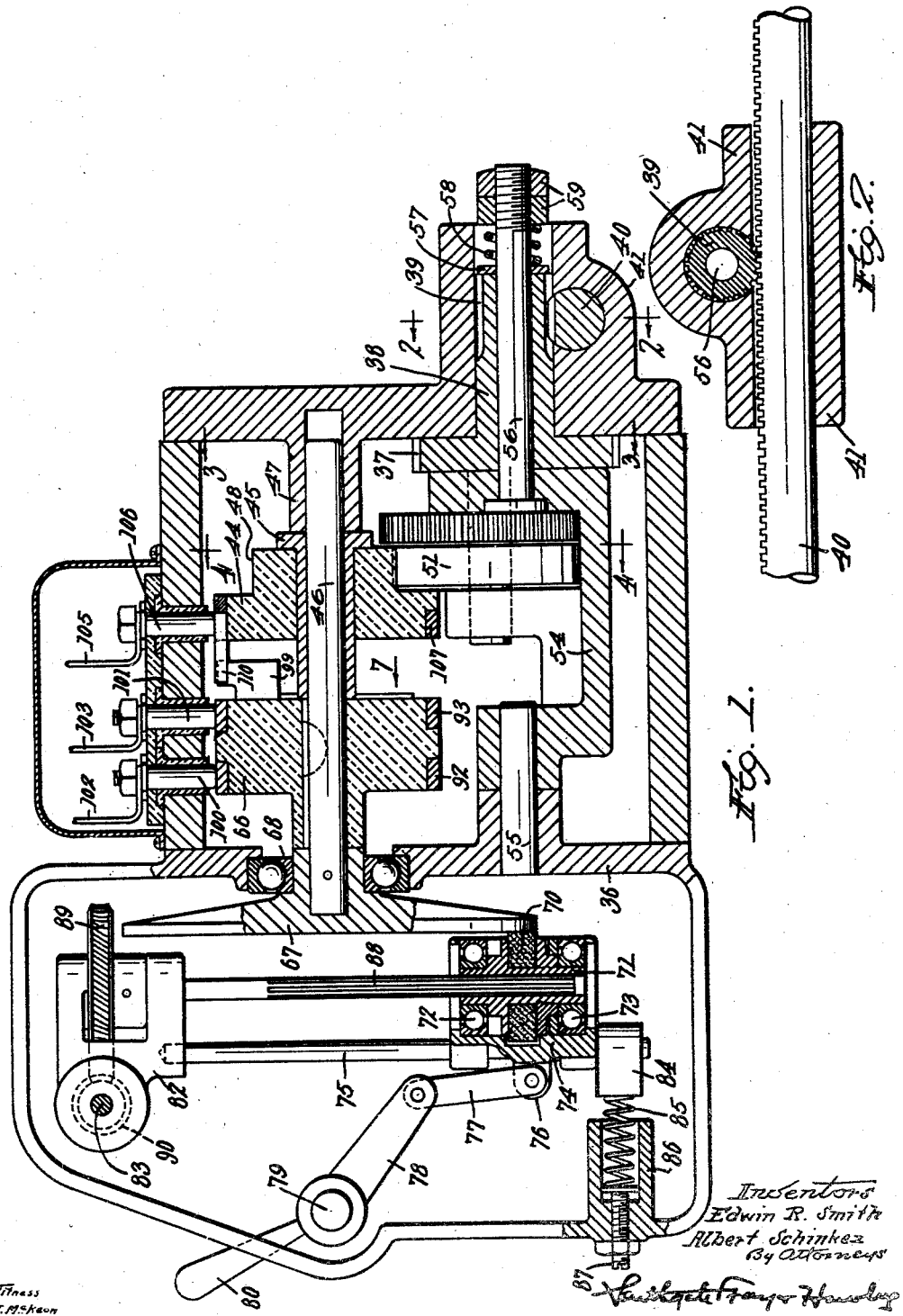

May 29, 1934.  E. R. SMITH ET AL  1,961,090
ELECTRICALLY CONTROLLED SPEED COORDINATING MECHANISM
Filed July 30, 1931    4 Sheets-Sheet 2
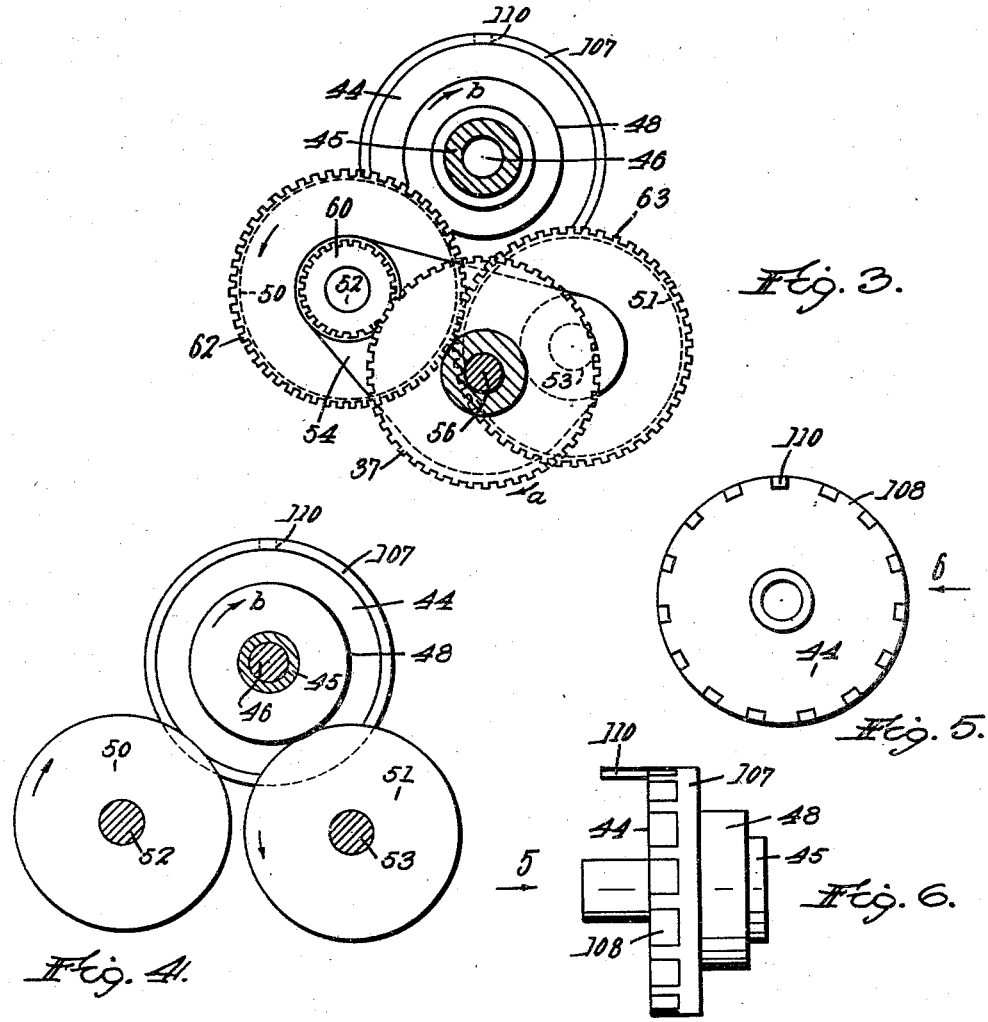
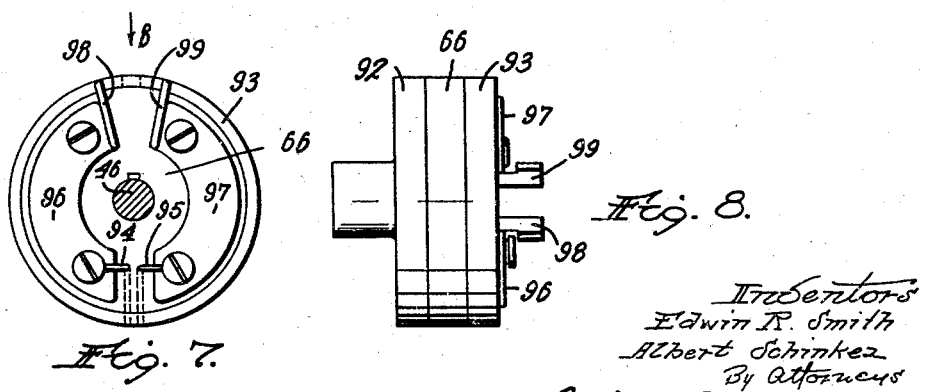
Inventors
Edwin R. Smith
Albert Schinker
By Attorneys
Southgate Fay & Hawley
Witness
W. McKeon May 29, 1934. E. R. SMITH ET AL 1,961,090
ELECTRICALLY CONTROLLED SPEED COORDINATING MECHANISM
Filed July 30, 1931 4 Sheets-Sheet 3
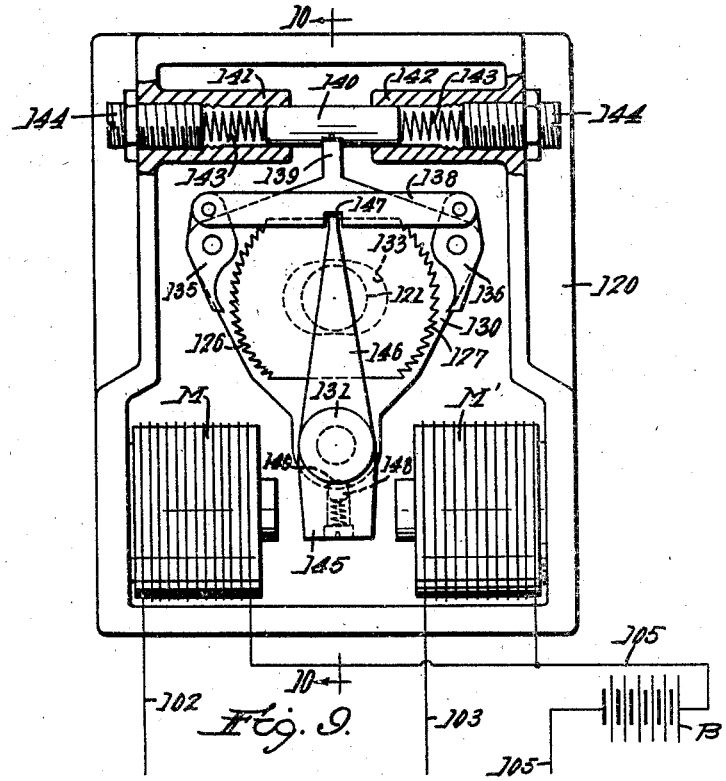
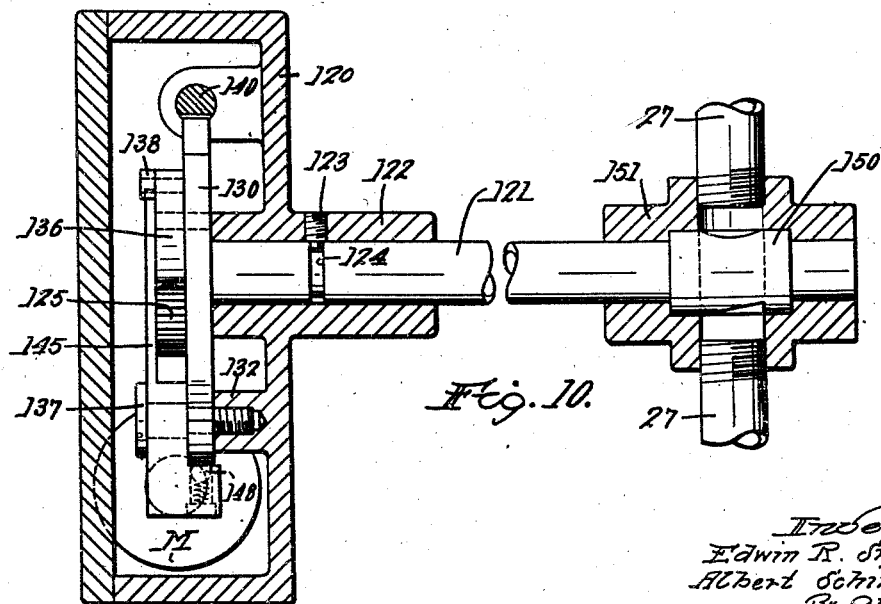
Inventors
Edwin R. Smith
Albert Schinkez
By Attorneys May 29, 1934. E. R. SMITH ET AL 1,961,090
ELECTRICALLY CONTROLLED SPEED COORDINATING MECHANISM
Filed July 30, 1931 4 Sheets-Sheet 4

Patented May 29, 1934

1,961,090

UNITED STATES PATENT OFFICE 1,961,090

ELECTRICALLY CONTROLLED SPEED COORDINATING MECHANISM

Edwin R. Smith and Albert Schinkez, Seneca Falls, N. Y., assignors to Seneca Falls Machine Company, Seneca Falls, N. Y., a corporation of Massachusetts Application July 30, 1931, Serial No. 554,050

19 Claims. (Cl. 82—2)

This invention relates to mechanism for maintaining a constant speed ratio between the rate of movement of a reciprocated member and the rate of movement of a rotated member in a machine tool, as for example between the tool carriage and the work spindle of an engine lathe.

In certain machine tools, it is desirable that the reciprocated member be actuated hydraulically, while the rotated member is driven by a motor or other independent actuating mechanism. Both a motor drive and a hydraulic drive are subject to more or less speed variation, due to changes in load or other factors.

It is the general object of our present invention to provide electrically controlled mechanism by which the rates of movement of a reciprocated member and a rotated member may be coordinated, or maintained in predetermined ratio.

We further provide for maintaining the same predetermined ratio or a different predetermined ratio when the direction of travel of the reciprocated member only is reversed.

Further features of our invention relate to the provision of means by which the predetermined ratio may be varied and adjusted, and to the provision of means by which the speed is regulated by a step-by-step movement, preferably under electric control.

Our invention further relates to arrangements and combinations of parts which will be hereinafter described and more particularly pointed out in the appended claims.

Two forms of the invention are shown in the drawings, in which

Fig. 1 is a sectional front elevation of a preferred form of our invention;

Fig. 2 is a transverse sectional elevation, taken along the line 2—2 in Fig. 1;

Fig. 3 is a sectional end elevation of certain driving mechanism, taken along the line 3—3 in Fig. 1;

Fig. 4 is a similar sectional elevation, taken along the line 4—4 in Fig. 1;

Fig. 5 is a an end elevation of one of the contact wheels, looking in the direction of the arrow 5 in Fig. 6;

Fig. 6 is a side elevation of said contact wheel, looking in the direction of the arrow 6 in Fig. 5;

Fig. 7 is a side elevation of a second contact wheel, looking in the direction of the arrow 7 in Fig. 1, and with the supporting shaft shown in section;

Fig. 8 is a plan view of the second contact wheel, looking in the direction of the arrow 8 in Fig. 7;

Fig. 9 is a front elevation, partly in section, of certain magnetically controlled feeding mechanism;

Fig. 10 is a sectional side elevation, taken along the line 10—10 in Fig. 9;

Figure 12:
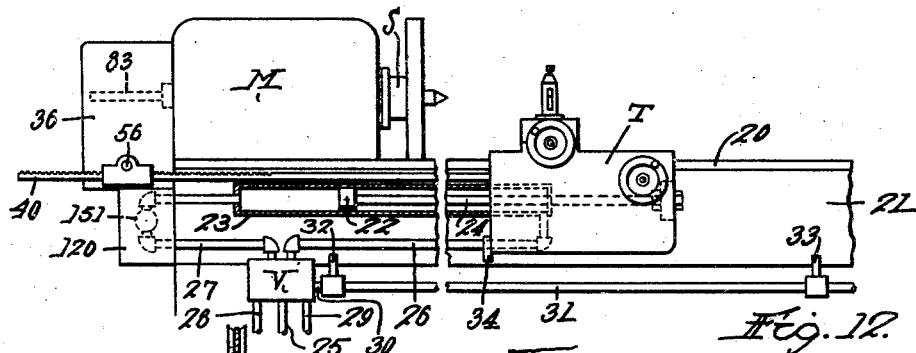
Fig. 12 is a view showing the application of our invention to an engine lathe.

Referring to Fig. 12, we have shown our invention as embodied in an engine lathe having a tool carriage T slidable on guideways 20 on a bed or frame 21 and having a work driving spindle S continuously rotated by a suitable motor M. A piston 22 is slidable in a fixed cylinder 23 and is connected by a piston rod 24 to the tool carriage T.

Oil under pressure is delivered through a supply pipe 25 to a reversing valve mechanism V which in turn is connected by pipes 26 and 27 to the opposite ends of the cylinder 23. Exhaust connections 28 and 29 are also provided for the return of oil to a storage tank or other receptacle.

The valve rod 30 of a movable valve member in the reversing valve mechanism V is connected to a longitudinally extending bar 31 on which reversing arms or dogs 32 or 33 are adjustably mounted. These dogs 32 and 33 are alternately engaged by an abutment 34 on the tool carriage T, by which engagement the valve member is shifted in the reversing valve mechanism V. The carriage is thus caused to travel in the opposite direction.

The mechanism thus far described is of the usual type and in itself forms no part of our present invention, which relates to special devices for coordinating the speed of rotation of the spindle S with the rate of travel of the tool carriage T. This coordinating mechanism in its preferred form is shown in detail in Figs. 1 to 10 inclusive.

Referring to Figs. 1 and 2, we have shown a casing 36 adapted to be secured in fixed position at the head end of an engine lathe. A gear 37 is provided with a hub 38 rotatable in a fixed bearing in the casing 36 and having a pinion 39 formed on the inner end thereof and positioned for engagement by the teeth of a rack bar 40 longitudinally slidable in a bearing 41 (Fig. 2) forming a portion of the casing 36.

The rack bar 40 is secured at one end to the tool carriage T and is reciprocated therewith. As the tool carriage moves back and forth, the rack bar 40, pinion 39 and gear 37 are moved in timed relation to the movement of the tool carriage.

A contact wheel 44 (Figs. 1 and 6), preferably of non-conducting material, is mounted on a bushing 45 which is freely rotatable on a shaft 46, one end of which is mounted in a bearing 47 fixed on the casing 36. The contact wheel 44 is provided with a hub portion 48 (Fig. 6) adapted to be engaged by either one of two friction driving wheels 50 or 51 (Fig. 4). These wheels 50 and 51 are rotatably mounted on studs 52 and 53, fixed in a supporting frame member 54 (Fig. 1) which is rotatably mounted at one end on a stud 55 fixed in the casing 36 and at the other end on a headed stud 56 supported in an axial opening in the hub 38 of the gear 37 previously described.

A washer 57 is forced against the outer end of the hub 38 by a spring 58 secured in compressed condition on the stud 56 by lock nuts 59. The supporting frame 54 is thus drawn firmly against the outer face of the gear 37 and is held in frictional engagement therewith.

The gear 37 (Fig. 3) engages a pinion 60 rotatable with the friction wheel 50, which wheel 50 is also provided with a gear 62 meshing with a similar and equal gear 63 secured to the friction wheel 51. Consequently the friction wheels 50 and 51 are rotated in opposite directions but in timed relation to the movement of the gear 37, which, as previously stated, rotates in timed relation to the reciprocating movement of the tool carriage T.

When the rack bar 40 is moved in one direction, the gear 37 will rotate in the direction of the arrow $a$ in Fig. 3 and such rotation of the gear 37 will rock the supporting frame 54 to cause the friction wheel 50 to engage the friction surface 48 of the contact wheel 44. Consequently the contact wheel will rotate in the direction of the arrow $b$ in Fig. 3 during a movement of the rack bar to the left.

When the direction of movement of the rack bar is reversed, the direction of rotation of the gear 37 is reversed, which first causes a rocking movement of the supporting frame 54 to move the friction wheel 51 to operative position as indicated in Fig. 4, and then causes the contact wheel 44 to be rotated in fixed relation to the movement of the rack bar 40 and still in the direction of the arrow $b$.

We have thus provided a construction by which the contact wheel 44 is rotated in a clockwise direction in unison with the reciprocating movement of the rack bar 40 and regardless of the direction of movement of the tool carriage T by which the rack bar is actuated.

A second contact wheel 66 (Figs. 1, 7 and 8) is keyed to the shaft 46 previously described and is rotatable therewith. A friction plate 67 is secured to one end of the shaft 46 and rotates in an antifriction bearing 68 in the casing 36.

A friction roll 70 is mounted on a sleeve 71 which in turn is supported in ball bearings 72 and 73 in a frame 74 slidable on a supporting rod 75. An ear 76 on the frame 74 is connected by a link 77 to an arm 78 mounted on a shaft 79 supported in fixed bearings and provided with a handle 80 by which the frame 74 may be shifted to cause the friction roll 70 to be moved toward or away from the axis of the disc 67, thus varying the speed ratio between the roll and the disc.

The supporting rod 75 is mounted in a head 82 pivoted to swing about the axis of a shaft 83. The lower end of the supporting rod 75 is provided with a socket 84 to receive one end of a compression spring 85, which spring is mounted in a fixed socket 86 and may be placed under tension by an adjusting screw 87. The spring 85 acts through the socket 84 and supporting rod 75 to force the frame 74 and friction roll 70 yieldingly against the disc 67.

The sleeve 71 which supports the roll 70 is grooved internally to receive corresponding portions of a ribbed shaft 88, mounted in the head 82 previously described and having a worm gear 89 fixed thereto. The worm gear 89 is engaged by a worm 90 on the shaft 83 previously described.

The shaft 83 (Fig. 12) is directly connected to the work driving spindle S or is connected thereto through suitable gearing of fixed ratio. Consequently the shaft 83 will rotate in timed relation to the rotation of the work driving spindle and will operate through the worm gear 89 and friction roll 70 to rotate the shaft 46 and contact wheel 66 in predetermined speed relation to the work driving spindle S which speed relation may be varied by manual adjustment of the friction roll 70 radially of the disc 67.

The gear and friction ratios are so designed that when the parts are properly adjusted, the contact wheel 66 will rotate at the same speed and in the same direction as the contact wheel 44 when the spindle and carriage are moving in the desired speed ratio.

The contact wheel 66 (Figs. 7 and 8), preferably of non-conducting material, is provided with two separate collector rings 92 and 93, connected by wires 94 and 95 (Fig. 7) to contact plates 96 and 97 mounted on one end of the wheel 66 and having laterally offset end portions 98 and 99.

Brushes 100 and 101 (Fig. 1) continuously engage the collector rings 92 and 93 and are connected by wires 102 and 103 to the windings of magnets M and M', (Fig. 9). These windings are connected through a common return wire 105 to a brush 106 engaging a collector ring 107 on the contact wheel 44.

The portion of the collector ring 107 with which the brush 106 engages is formed with a series of slots or recesses 108 (Fig. 6), which recesses are filled with non-conducting material to provide a continuous cylindrical surface. The electrical engagement of the brush 106 with the ring 107 is thus intermittent.

A lug 110 projects laterally from the collector ring 107 and is positioned between the ends 98 and 99 of the contact plates 96 and 97 on the contact wheel 66. When the lug 110 engages either one of the contact members 98 or 99, a circuit is completed through one of the magnets M or M' (Fig. 9). Any suitable source of current such as a battery B may be provided, and will be understood that the brushes 100, 101 and 106 are suitably insulated from the casing 36.

In Figs. 9 and 10 we have shown intermittently operating feeding mechanism under the control of the magnets M and M'. This mechanism comprises a base or stand 120 within which magnets M and M' are mounted in opposed position.

A shaft 121 (Fig. 10) is rotatable in a bearing 122 in the stand 120 and is held from axial movement therein by a screw 123 extending into a groove 124. A ratchet wheel 125 is secured to the end of the shaft 121 and is provided with a series of ratchet teeth 126 at one side facing in one direction, and with a second series of ratchet teeth 127 at the other side facing in the opposite direction.

A plate 130 is mounted on a stud 131 threaded into a boss 132 and projecting forward from the back of the casing 120. The plate 130 has an elongated slot 133 through which the shaft 121 extends. This slot permits limited swinging movement of the plate 130 in either direction.

Pawls 136 and 135 are pivoted near the opposite side edges of the plate 130 and are positioned to engage the teeth 126 and 127 respectively.

A cross bar 138 is pivoted to upwardly extending portions of the pawls 135 and 136 and holds the pawls in spaced relation, so that only one pawl at a time can engage the teeth on the ratchet wheel 125. The plate 130 has an upwardly projecting lug 139 extending into a notch in a rod or bar 140, slidable in bearings 141 and 142 projecting inward from the sides of the casing 120.

Compression springs 143 are mounted in the bearings 141 and 142 and engage the ends of the sliding rod 140. Screws 144 threaded in the outer ends of the bearing openings provide for convenient adjustment of the springs 143. These springs are to be so adjusted that the rod 140 will normally occupy the mid-position shown in Fig. 9, to which position the springs return the rod after displacement therefrom.

An armature 145 is loosely pivoted on the stud 131 previously described and projects downward between the poles of the magnets M and M'. An arm 146 extends upward from the armature 145 into a notch 147 in the cross bar 138.

The armature 145 is normally centered with respect to the plate 130 by a spring-pressed ball 148, yieldingly seated in a notch 149 in the lower end of the plate 130.

The shaft 121 is shown as supporting a throttle valve 150 (Fig. 10) rotatable in a valve casing 151 and controlling the flow of oil through the pipe 27 previously described, by which pipe oil is supplied to the left hand end of the cylinder 23 for the working stroke of the tool carriage T. The valve 150 may be of commercial construction and is so designed that a comparatively small amount of rotary movement will substantially effect the flow of oil.

Having described the construction of this form of our invention, the operation thereof is as follows:

The contact wheels 44 and 66 are driven from the tool carriage T and spindle S in such ratio that when the spindle and tool carriage are traveling at their desired predetermined speeds, the contact wheels 44 and 66 will rotate at the same speed and in the same direction, with the contact member 110 located mid-way between the contact members 98 and 99 (Fig. 7) and with the valve-adjusting mechanism located in mid-position and inoperative as shown in Fig. 9.

If the tool carriage slows down relatively to the rotation of the spindle, the contact wheel 44 will rotate more slowly than the contact wheel 66, thus causing the member 110 on the wheel 44 to engage the contact member 98 on the contact wheel 66. This closes the circuit through the wire 102 to the magnet M, thus drawing the armature 145 to the left in Fig. 9 and causing the pawl 136 to engage the teeth 127 on the ratchet wheel 125 and to advance the ratchet wheel in a clockwise direction.

This in turn acts through the shaft 121 to the valve 150 in a direction to increase the flow of oil to the cylinder 23, thus increasing the speed of the tool carriage T. As soon as the brush 106 engages a non-conducting spot 108 (Fig. 6), the magnetic circuit is broken and the parts return to normal position.

If the contact members 110 and 98 are still engaged, additional magnetic impulses will be given as often as the brush 106 passes from a non-conducting spot 108 to reengage the collector ring 107.

The ratchet wheel 105 will thus be given intermittent advance movements, one tooth at a time, until the valve 150 has been adjusted sufficiently to bring the speed of the tool carriage back to its normal relation to the speed of the spindle S. When this has been accomplished, the contact member 110 will be returned to its mid-position and the wheels 44 and 66 will again rotate in unison until another variation in speed occurs.

If it so happens that the tool carriage T travels too fast, rather than too slow, relative to the spindle S, the magnet M' will be energized and the valve 150 will be turned in the opposite direction to reduce the flow of oil to the cylinder 23. Thus a predetermined speed relation will be maintained between the spindle and the tool carriage. This predetermined relation may be changed, however, by adjustment of the friction roll 70 radially of the friction disc 67, causing the mechanism to thereafter operate to maintain a different speed relation.

When the travel of the tool carriage is reversed, the rotation of the gear 37 (Fig. 1) is likewise reversed but this gear 37, by frictional contact with the supporting frame 54, swings the frame on its bearings and thus reverses the contact of the friction wheels 50 and 51 with the friction wheel 48 so that the direction of rotation of the wheel 44 remains unchanged.

Consequently the speed coordinating mechanism operates during movement of the tool carriage in both directions and may be used to maintain a definite speed relation in both directions of travel.

As shown in the drawings, the speed will be increased during the travel to the left, due to the reduction in cross section of the cylinder at the right hand end by the cross sectional area of the piston rod 24. If it is desired to maintain the same speed in both directions, the gears 62 and 63 (Fig. 3) may be selected in such ratio as to compensate for the difference in effective cross section of the two ends of the cylinder. The gears 62 and 63 may also be selected in such ratio as to produce any other desired speed relation. In every case, the coordinating mechanism operates effectively in both directions to maintain whatever speed ratios have been selected.

Figure 11:
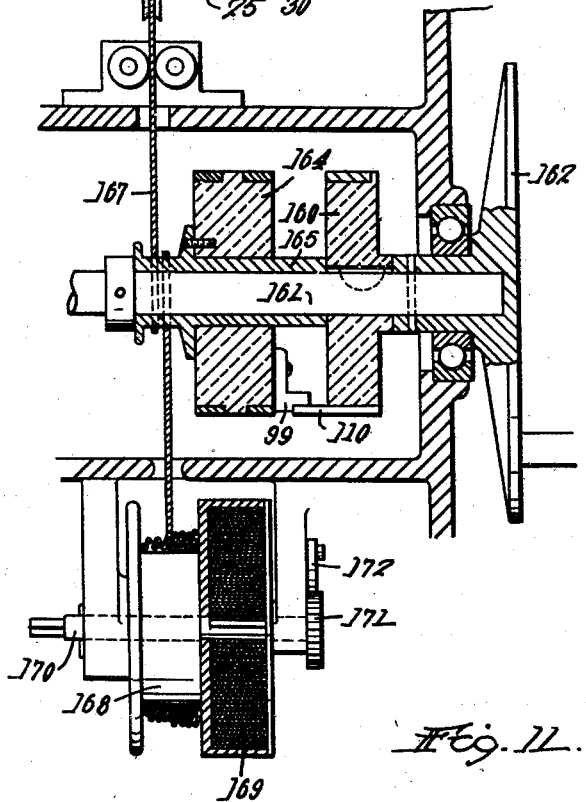
Fig. 11 is a sectional front elevation of a modified construction.

In Fig. 11 we have shown a somewhat simpler mechanism where speed regulation in one direction only is desired. As shown in Fig. 11, a contact wheel 160 is mounted on a shaft 161, rotated by a friction disc 162 corresponding to the friction disc 67 previously described and driven in timed relation to the rotation of the work driving spindle.

A second contact wheel 164 is secured to a sleeve or bushing 165 freely rotatable on the shaft 161. The contact wheels 160 and 164 correspond in construction to the wheels 44 and 66 previously described and are similarly engaged with brushes connected to feeding mechanism such as is shown in Figs. 9 and 10.

A cord or cable 167 is connected at one end to the tool carriage T and at the other end is wrapped around a drum 168 forming part of a spring motor and rotated in a direction to wind up the cord by a relatively heavy clock spring 169. An intermediate portion of the cord 167 is wrapped one or more times around a hub portion of the sleeve or bushing 165.

The spring 169 is mounted on an arbor 170, adapted to receive a winding key at one end and provided with a ratchet 171 at the other end engaged by a pawl 172. By turning the arbor, the tension of the spring 169 may be adjusted as desired.

The operation of this form of our invention during the working stroke is the same as in the previous construction, the wheel 160 being rotated in fixed relation to the rotation of the work spindle and the wheel 164 being rotated by the action of the cord 167 as it is drawn back and forth by the tool carriage in one direction and the winding drum in the other direction.

If the speed of the tool carriage is decreased or increased relatively to the spindle, contact will be made between the contact elements on the wheels 160 and 164, and the flow of oil will be adjusted as in the preferred form.

On the return movement of the tool carriage, however, the contact wheel 160 will first turn slightly to the limiting position defined by the contact members on the wheels 160 and 164, thus energizing the magnet which causes the valve 150 (Fig. 10) to be opened to its fullest extent. After this slight movement, the cord 167 slips around the hub portion of the bushing 165 without further effect. Thus in cases where a return stroke at high speed but without accurate speed regulation is satisfactory, this simpler form of our improved control mechanism may be utilized.

Having thus described two forms of our invention, we do not wish to be limited to the details herein disclosed, otherwise than as set forth in the claims, but what we claim is:—

1. In a machine tool having a reciprocated and a rotating member, in combination, actuating means for reciprocating said first member, actuating means for rotating said second member, and means effective to maintain a predetermined and fixed speed ratio between said members, said latter means including a control member effective to vary the ratio of movement of one actuating means, and devices to give said control member a plurality of successive adjusting movements in a selected direction upon a single indication of relative speed variation between said members, thereby correcting said speed variation.

2. The combination is a machine tool as set forth in claim 1, in which said adjusting devices include a ratchet wheel, a speed changing device for one of the actuating means and movable by said ratchet wheel, two feed pawls separately engageable with said ratchet wheel and effective to feed said wheel in either of two opposite directions, and means to selectively engage said pawls and to move the engaged pawl to give said wheel an adjusting movement in an indicated direction.

3. The combination in a machine tool as set forth in claim 1, in which said adjusting device include a rotary throttle valve, a ratchet wheel connected thereto, two separate pawls for said ratchet wheel operative in opposite directions, and means to engage a selected pawl and give said valve an opening or a closing movement and to simultaneously prevent engagement of the other pawl.

4. The combination in a machine tool as set forth in claim 1, in which said adjusting devices include a rotary throttle valve, a ratchet wheel connected thereto, two separate pawls for said ratchet wheel operative in opposite directions, means to engage a selected pawl and give said valve an opening or a closing movement and to simultaneously prevent engagement of the other pawl, and means to successively repeat such engagement until normal speed relation is restored.

5. The combination in a machine tool as set forth in claim 1, in which said adjusting devices include a rotary throttle valve, a ratchet wheel connected thereto and having separate sets of oppositely facing teeth, a separate pawl for each set of teeth, means to selectively engage said pawls to give said valve an opening or a closing movement, and means to repeat said engagement until the normal speed relation has been restored.

6. The combination in a machine tool as set forth in claim 1, in which said adjusting devices include a rotary throttle valve, a ratchet wheel connected thereto and having separate sets of oppositely facing teeth, a separate pawl for each set of teeth, a pair of opposed magnets, an armature mounted between said opposed magnets, and connections from said armature to said pawls through which movement of said armature in either direction engages one pawl and simultaneously disengages the other pawl.

7. In a machine tool having a reciprocated and a rotating member, in combination, actuating means for reciprocating said first member, separate actuating means for rotating said second member in predetermined speed relation to the travel of said reciprocated member, a control member for one actuating means, and means to give said control member an adjusting movement in a direction to correct a deviation in speed relation between said members and to successively repeat such adjusting movement until the predetermined speed relation has been restored.

8. In a machine tool having a reciprocated member and a rotated member, in combination, a speed coordinating mechanism comprising a contact member moved in timed relation to said reciprocated member, a second and adjacent contact member moved in timed relation to said rotated member, a speed control device, and means to adjust said device to coordinate the speed upon interengagement of said contact members.

9. The combination in a machine tool as set forth in claim 8, in which one of said contact members has two spaced contact plates controlling different magnetic circuits, and the other contact member has a single contact plate connected to the common portion of said circuits, said single contact plate being normally positioned between said spaced plates but out of contact therewith.

10. The combination in a machine tool as set forth in claim 8, in which one of said contact members has two spaced contact plates controlling different magnetic circuits, and the other contact member has a single contact plate connected to the common portion of said circuits, said single contact plate being normally positioned between said spaced plates but out of contact therewith, and said single contact plate being connected to a collector ring having an interrupted brush-engaging surface, whereby the circuit is intermittently made and broken.

11. In a machine tool having a reciprocated member and a rotated member, in combination, a speed coordinating mechanism comprising a contact member moved in timed relation to said reciprocated member, a second and adjacent contact member moved in timed relation to said rotated member, a speed control device, and means to give said device an adjusting movement upon deviation in relative speed between said members, said adjusting means being at all times operable and effective with the reciprocated member moving alternately in opposite directions.

12. In a machine tool having a reciprocated member and a rotated member, in combination, a speed coordinating mechanism comprising a contact member moved in timed relation to said reciprocated member, a second and adjacent contact member moved in timed relation to said rotated member, a speed control device, means to give said device an adjusting movement upon deviation in relative speed between said members, and a reversing connection between said reciprocated member and said adjusting means, operable upon reversal of movement of said reciprocated member.

13. In a machine tool having a reciprocated member and a rotated member, in combination, a speed coordinating mechanism comprising a contact member moved in timed relation to said reciprocated member, a second and adjacent contact member moved in timed relation to said rotated member, a speed control device, means to give said device an adjusting movement upon deviation in relative speed between said members, a reversing connection between said reciprocated member and said adjusting means, and means to automatically reverse said connection upon reversal of travel of said reciprocated member.

14. In a machine tool having a reciprocated and a rotating member, in combination, hydraulic means for reciprocating said first member, additional and separate actuating means for rotating said second member, a control member for said hydraulic actuating means, and means to adjust said control member to vary the hydraulic feed in accordance with the relative speed of rotation of said second member and to thereby automatically maintain one predetermined coordinated speed relation between said members when said reciprocating member is moved in one direction and another predetermined coordinated speed relation when said member is moved in the opposite direction.

15. In a machine tool having a reciprocated and a rotating member, in combination, actuating means for reciprocating said first member, actuating means for rotating said second member, a control member for one actuating means, and means to adjust said control member, said means including a contact member rotatable in timed relation to the travel of said reciprocated member, and means to reverse the connections between said contact member and said reciprocating member upon reversal of said latter member.

16. In a machine tool having a reciprocated and a rotating member, in combination, actuating means for reciprocating said first member, actuating means for rotating said second member, a control member for one actuating means, and means to adjust said control member, said means including a contact member, a friction wheel secured thereto, a pair of friction wheels, connections from said reciprocated member effective to rotate said latter wheels in opposite directions, and means to engage said latter wheels alternately with said first wheel in accordance with the direction of movement of said reciprocated member.

17. In a machine tool having a reciprocated and a rotating member, in combination, actuating means for reciprocating said first member, actuating means for rotating said second member, a control member for one actuating means, devices to give said control member an adjusting movement in a direction to correct a deviation in speed relation between said members, said devices including parts movable in timed relation to said reciprocating and said rotated members, respectively, and connections between one of said members and one of said parts which include a cord and friction drum.

18. The combination in a machine tool as set forth in claim 17, in which a spring motor is provided for moving said cord and drum in one direction.

19. The combination in a machine tool as set forth in claim 17, in which a spring motor is provided said cord in reverse direction increases the speed of the reciprocated member and further movement of the cord in the reverse direction causes slipping of the cord on the friction drum.

EDWIN R. SMITH.
ALBERT SCHINKEZ.